Patented Oct. 17, 1939

2,176,802

UNITED STATES PATENT OFFICE 2,176,802

METHOD OF MAKING HARD METAL ALLOYS

Johan Romp, Eindhoven, Netherlands, assignor to N. V. Philips' Gloeilampenfabrieken, Eindhoven, Netherlands No Drawing. Application April 20, 1938, Serial No. 203,196. In Germany May 5, 1937

2 Claims. (Cl. 75—137)

My invention relates to the manufacture of hard metal alloys in which a powdery mixture of tungsten carbide, and cobalt is first compressed and then sintered by heating.

I have found that, to obtain a dense material, the carbon content of the mixture must be maintained within very narrow limits, because either an excess or a deficiency of the carbon content causes the resulting alloy to be porous. In the first case the excess carbon remains available as a non-metallic inclusion in the material, and in the second case the mixture loses too much of its sintering capacity.

In the British Patent #213,524 dated March 29, 1923, it has been proposed to sinter tungsten carbide-cobalt mixtures by heating the same in a carbon-containing surrounding which may consist either of solid carbon or of a gas containing carbon. This method is better than heating in a surrounding free from carbon, such as hydrogen, because undesirable extraction of carbon from the sintering mixture is avoided, but it has the drawback that a mixture whose carbon content lies within very narrow limits will gradually obtain a free carbon excess near the surface due to the absorption of carbon. This effect often manifests itself even to a depth of several millimeters which is very undesirable, particularly with small size articles, because of surface porosity.

According to the invention, I overcome the above difficulty by again heating the articles in a reducing atmosphere having a carbon-absorbing capacity, such as hydrogen or forming gas, for such a time and at such a temperature as is necessary to extract the available free carbon from the article.

The method according to the invention has the advantage that the excess carbon absorbed during the sintering-heating operation in a carbon-containing surrounding can be extracted again from the sintered article in such a manner that the resulting material has a great density and is substantially non-porous both internally and at the surface. The invention may also be used when the carbon excess results from using an excessive quantity of carbon in the starting mixture.

The following specific example illustrates the method of the present invention.

A mixture of 95 gms. of tungsten carbide powder and 5 gms. of cobalt powder is pressed into articles which are packed in sugar carbon powder and sintered for 1 to 1½ hours at a temperature of about 1450° C. The articles are then freed from carbon powder, and then heated in a hydrogen current at a temperature of about 1450° C. This heating is continued until the desired result is achieved, i. e. the absence of pores which can be ascertained by a microscopic examination of the material, for instance, of an unetched polished piece 100 times enlarged. Generally the heating is continued for about 1 to 2 hours.

While I have described my invention in connection with specific example, I do not wish to be limited thereto but desire the appended claims to be construed as broadly as permissible in view of the prior art.

What I claim is:

1. A method of making a hard metal body comprising the steps of pressing a powdery mixture of tungsten carbide and cobalt to form a body, fully sintering the body in a carbon-containing surrounding, and then heating the sintered body in a reducing atmosphere having a carbon-absorbing capacity to remove the available free carbon from the surface region thereof.

2. A method of making a hard metal body comprising the steps of pressing a powdery mixture of tungsten carbide and cobalt to form a body, fully sintering the body in a carbon-containing surrounding, and then heating the sintered body in hydrogen to remove the available free carbon from the surface region thereof.

JOHAN ROMP.